May 1, 1934.    W. M. THOMAS    1,957,371
LENS STRUCTURE WITH PRISMS
Filed Dec. 5, 1933
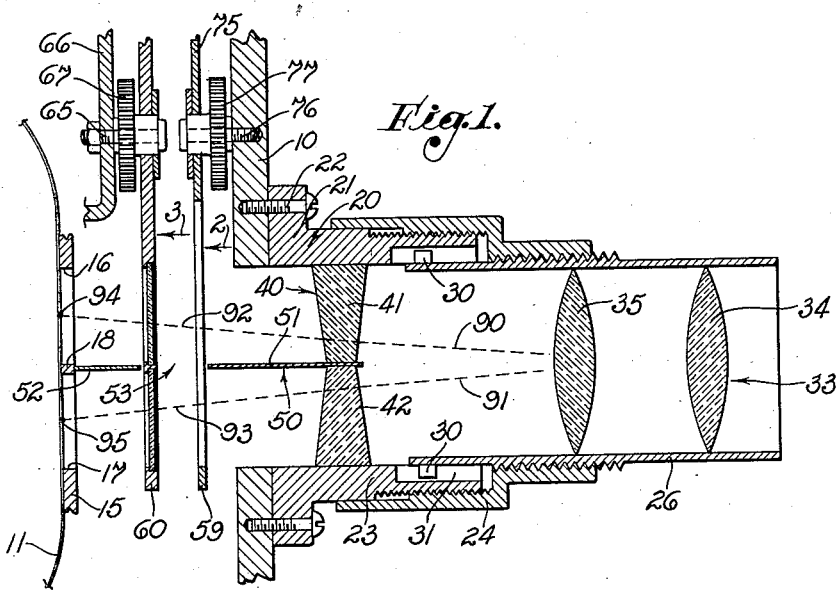
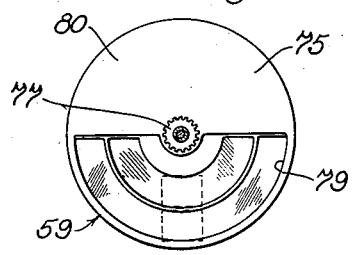
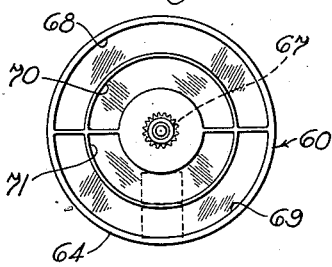
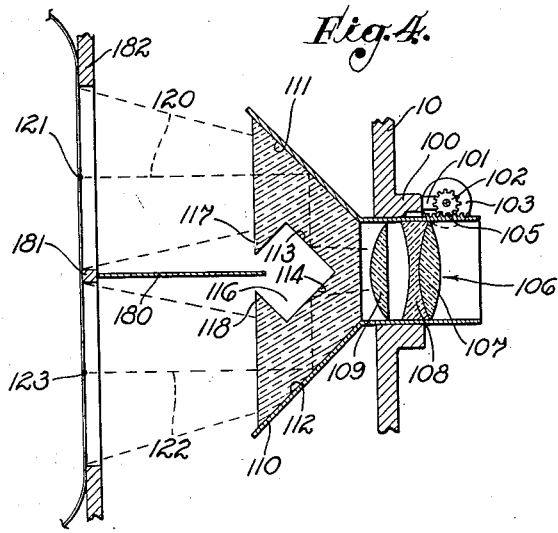
INVENTOR:
WILLIAM M. THOMAS,
BY
ATTORNEY.

Patented May 1, 1934

1,957,371

UNITED STATES PATENT OFFICE 1,957,371

LENS STRUCTURE WITH PRISMS

William M. Thomas, Los Angeles, Calif.

Application December 5, 1933, Serial No. 700,964

7 Claims. (Cl. 88—16.4)

My invention relates to a novel lens structure for use in conjunction with a camera or other photographic apparatus, as well as to a photographic apparatus including this lens structure in novel relationship. The embodiments to be hereinafter described are particularly applicable to a system of taking still or motion pictures, though the principles of the invention may be applied with equal facility to a projection system wherein it is desired to superimpose constituent images. Furthermore, the features of the invention are applicable both to the taking and projecting of black-and-white pictures and colored pictures.

It is an object of the present invention to use a single-lens system in front of a film and in conjunction with a beam-splitting structure for forming the light rays passing through the single-lens system into two identical beams, or for combining two light beams so that they can be moved through a single-lens system when used for projection purposes. The use of a single-lens system permits the photographing of objects from a single viewpoint, or the projecting of images from a single-lens system as distinguished from a plurality of lens systems.

One application of the invention is in conjunction with the taking or projecting of colored motion pictures. In the additive system of producing colored pictures, adjacent frames of the motion picture film are exposed through two or more color filters of different color to form color-value images. When such color-value images are projected through correspondingly colored filters, the images can be brought into correct superimposition so as to form a composite image the colors of which correspond to the colors of the object originally photographed. In the embodiment of the invention to be hereinafter described, only two color filters are used, though it is within the scope of the present invention to utilize a larger number of such filters.

When projecting adjacent film images so as to form a composite image, it is essential that corresponding points on the two images be correspondingly placed with respect to the adjacent frames or image areas. In exposing such images it has been found that, in the absence of any correcting means, a change in focus of the lens system will change the spacing of corresponding points on the adjacent film images so as to preclude the possibility of projecting these images in superimposed relationship. Stated in other words, corresponding points on the two film images will not be spaced a constant distance from each other when the focus of the lens system is changed, so that any attempt to superimpose the images by bringing the frames thereof or boundaries of the image areas into registration, as is done in the projection system, results in the formation of two images rather than a single composite image. It is an object of the present invention to provide a lens structure including a single-lens system and a simple correcting means which not only permits the formation of two images on the film, but which also automatically maintains corresponding portions of these images spaced a constant distance from each other regardless of a movement of the lens system to change the objective field of focus.

Even if properly positioned film images are produced, attempts to project such images onto screens positioned varying distances from the lens system result in failure unless compensating means is provided for bringing the images into superimposed relationship. Thus, while a lens structure can be designed to operate satisfactorily in conjunction with a screen at a fixed distance from the projector, the images will not be superimposed if the screen is moved closer to the projector, for instance, and if the focus of the lens system is correspondingly changed to secure sharp screen images. If we consider light rays drawn from corresponding points on the adjacent film images, it is necessary that these rays intersect in a point on the screen regardless of the distance between the screen and the lens system. It is an object of the present invention to provide a system for accomplishing this result automatically as the focus of the lens system is changed.

It is a further object of the invention to provide a lens structure including a single-lens system used in conjunction with a prism means between the lens system and the film, this lens system being retained in stationary position so that when the lens system is focused relative movement between the lens system and the prism means takes place. This structure can be made to automatically correct registration as set forth above.

It is a further object of the invention to provide a novel septum means extending between the prism means and the film, and in one form of the invention to provide a divided septum means defining a space through which the shutter and/or color-filter support can move.

It is another object of the invention to provide a septum means extending rearward from a position between two prisms and to a position adjacent the film, thus separating the light rays respectively passing through the two prisms.

Following the principles to be hereinafter set forth, the lens structure of the invention finds particular utility in conjunction with cameras utilizing 16 mm. film or smaller, wherein lenses having a focal distance of 2" or greater are used. In such instances the prisms can be designed with a relatively small angle between the front and rear faces thereof and no apparent distortion is introduced into the system. With larger sizes of film, or with smaller focal distances, distortion in varying amounts may be present in a 16 mm. system, though in some instances this distortion is not sufficiently apparent to negative the utility of the lens structure with this size of film or even with larger sizes of film. It is an object of the present invention to provide a lens structure which is particularly applicable to cameras using 16 mm. film or smaller, this structure having a focal distance of 2" or more.

Further objects of the invention lie in the novel enclosing structure for the prisms and lens system, and in the novel adjustment structure permitting a change in position of the lens system relative to the prisms.

Further objects and advantages of the invention will be made evident hereinafter.

Referring to the drawing in which I have illustrated two embodiments of the invention.

Fig. 1 is a fragmentary sectional view of a camera incorporating the preferred embodiment of the lens system.

Fig. 2 is a view illustrating the shutter and is taken as indicated by the arrow 2 of Fig. 1.

Fig. 3 is a view taken as indicated by the arrow 3 of Fig. 1 and illustrates one form of color-filter support.

Fig. 4 is a diagrammatic view illustrating an alternative form of the invention.

Referring particularly to Fig. 1 the lens system of my invention is shown in conjunction with a camera including a front wall 10. A film 11 moves from one reel to another in any conventional manner, this movement being effected frame-by-frame by any suitable film-advancing means not shown. This film moves adjacent an aperture plate 15 including apertures 16 and 17 separated by a wall 18, these apertures framing the adjacent images projected onto the film by the lens structure, as will be hereinafter described, identical images being simultaneously projected onto the film on adjacent image areas thereof.

In one type of camera it has been found desirable to advance the film 11 frame-by-frame so that each image area or frame thereof is twice exposed, once through the upper aperture 16 and again through the lower aperture 17. When such a system is used it is clear that the images must be identically positioned with respect to the boundaries of the image areas or frames, otherwise the image produced by the second exposure will not be superimposed on the image produced by the first exposure. Similarly, regardless of whether or not a double-exposure system is used, the images must be correspondingly positioned with respect to their respective frames or image areas if an attempt is later made to superimpose the adjacent images by simultaneous projection thereof or by other means.

It has been found, however, that with conventional lens systems corresponding points on the adjacent film areas will not be separated a constant distance when the objective field of focus is changed. Thus, while it is possible to design a lens structure which correctly registers on the adjacent image areas any object appearing in a given objective field of focus, any attempt to change this objective field of focus will result in the formation of images which cannot be superimposed. The lens system of the present invention automatically overcomes this defect.

In the form of the invention shown in Fig. 1, I have illustrated a mounting member 20 providing a flange 21 secured to the front wall 10 as by screws 22. This mounting member includes a forward extending sleeve 23 which is externally threaded to receive an adjustment member 24 also of sleeve shape.

Telescoping with the sleeve 23 of the mounting member 20 is a barrel 26 which is also externally threaded, these threads being of greater pitch than the threads on the sleeve 23. Corresponding threads are positioned on the adjustment member 24 so that if the barrel 26 is prevented from rotation and the adjustment member 24 is turned, the barrel will be moved in a forward-rearward direction due to the fact that the threads on the barrel 26 and the sleeve 23 are of different pitch. In one form of the invention the forward-rearward movement of the barrel 26 is dependent upon the additive action of the two series of threads. If desired, however, a differential action may be obtained by cutting one series of threads in a left-hand direction and the other in a right-hand direction.

Any suitable means may be used for preventing rotation of the barrel 26 with respect to the mounting member 20. In the form shown this means includes pins 30 extending outward from the barrel 26 and sliding in longitudinal grooves 31 of the sleeve 23.

The barrel 26 carries a single-lens system 33 which may comprise one or more lens elements. In the form shown these lens elements are diagrammatically indicated by the numerals 34 and 35, the light rays from the object to be photographed passing successively through these lens elements.

Positioned in fixed relationship with respect to the mounting member 20 is a prism means 40 which acts to split the light rays passing through the lens system 33, thus forming identical images on the adjacent image areas of the film 11. In the preferred embodiment this prism means is in the form of two prisms indicated by numerals 41 and 42 mounted by any suitable means in the mounting member 20 so that the lens system 33 may be moved in its forward-rearward direction without carrying the prisms 41 and 42 therewith.

A septum means 50 preferably extends rearward from a mid-section of the prism means 40 to a position adjacent the film. In the embodiment shown this septum means includes septum members 51 and 52 spaced end-to-end so as to define a space 53 for a purpose to be hereinafter described. The septum means 50 is preferably secured in the mounting member 20, and preferably, though not necessarily, extends between the prisms 40 and 41. The septum member 52 may be secured in fixed relation with the wall 18 of the aperture plate 15 by any suitable means. In some instances it is possible to dispense with the wall 18 and extend the septum member 52 even closer to the field, allowing this septum to separate the image areas on the film 11 the desired amount. The septum means 50 acts to separate the two beams formed by the prisms 41 and 42, preventing any cross rays which would otherwise move, for instance, from the prism 41 to the aperture 17.

In the embodiment shown it is desirable to provide the space 53 so that a shutter 59 or a color-filter support 60, or both, may be positioned therein so as to intercept the beams of light passing through the prisms 41 and 42. The embodiment illustrated is particularly adapted for the exposing of colored motion pictures wherein the adjacent image areas of the film 11 carry color-value images. In accomplishing this result it is desirable to position a red color filter, for instance, in the path of the rays reaching one of the image areas, and to position a green color filter in the path of the rays reaching the other image area. The film thus carries alternate color-value images exposed through the same color of filter. If a double-exposure system is utilized, it is necessary to reverse the filters when the film has been advanced one frame. This may be accomplished by any suitable filter support either of the reciprocating or rotary type. The filter support illustrated is indicated by the numeral 64 and is pivoted on a pin 65 carried in a rear wall 66 of the camera. A pinion 67 may be secured to this color-filter support, this pinion being driven by any suitable means operatively connected to the film-advancing means. This color-filter support includes an outer series of openings including openings 68 and 69 respectively carrying red and green color filters. It also includes an inner series of openings including openings 70 and 71 respectively carrying green and red color filters. Thus, when the color-filter support 64 is disposed as indicated in Figs. 1 and 3 the beams formed by the prisms 41 and 42 will be respectively intercepted by red and green color filters. At a later instant of time, when the film 11 has been advanced one frame, the color-filter support will revolve one-half revolution so that the beams formed by the prisms 41 and 42 are respectively intercepted by green and red color filters. The image area of the film previously exposed in the aperture 16 through a red color filter will thus be exposed a second time in the lower aperture 17 through a red color filter. It will be understood, however, that other types of color-filter supports of the reciproacting type may be used. Furthermore, if the film is advanced more than one frame at a time, it is possible to dispense with the moving color-filter support and to use color filters which are maintained in fixed relation with respect to the apertures 16 and 17.

Any suitable shutter 59 may be used. In the embodiment shown this shutter is in the form of a disc 75 pivoted on a pin 76 retained in the front wall 10 and carrying a pinion 77 which is operatively connected to the film-advancing means by any suitable means. The shutter 59 provides an opening 79 and a blade 80, and this shutter is rotated at such speed that the blade 80 intercepts the beams formed by the prisms 41 and 42 during the time that the film is being advanced and the color filters are being reversed.

It is preferable to pivot the shutter 59 and the color-filter support 60 about a common axis, this axis preferably lying in a medial plane passing through the apertures 16 and 17. In this way the shutter blade 80 substantially simultaneously enters the beams formed by the prisms 41 and 42 and substantially simultaneously leaves these beams, thus cutting off the beams at substantially the same instant of time and at a later instant leaving these beams substantially simultaneously.

In explaining the operation of this form of the invention it will be clear that the single-lens system 33 in effect has a single viewpoint, thus eliminating all parallax. The light rays passing through this lens system are bent outward by the prisms 41 and 42 to secure the desired separation on the film 11. Thus, in Fig. 1 I have indicated rays 90 and 91 coming from a common point in the objective field of focus and passing through the lens systems 33 and being bent outward by the prisms 41 and 42 to form rays 92 and 93, which meet the film at points 94 and 95. These points are preferably spaced a distance from each other substantially equal to the center-to-center spacing of the adjacent image areas or frames of the film 11.

If now we consider that the prisms 41 and 42 are moved forward with the lens elements 35 and 34 so as to focus on an objective field which is closer to the camera, it will be apparent that the rays emanating from a common point in this newly-focused objective field will not reach the film 11 at the points 94 and 95, but will instead reach the film at points spaced from these points 94 and 95. Unless this defect is compensated for, it is impossible to successfully produce a double-exposed image area. So also, it is impossible to superimpose the resulting images on the adjacent image areas by bringing the boundaries of these image areas into alignment as is done in a projection system which simultaneously projects adjacent image areas. I have found it possible to compensate for this defect by maintaining the prisms 41 and 42 in fixed relationship with respect to the mounting member 20. Thus, in the embodiment shown in Fig. 1, the lens system 33 can be moved forward to focus on an objective field which is closer to the camera, in which event the lens elements 34 and 35 will move away from the prisms 41 and 42. By proper design of these prisms, this separation can be made to displace the light rays drawn from the same point in this newly-focused objective field and passing through the prisms 41 and 42, this displacement being such that the points of impingement of these rays on the film will always be at the points 94 and 95 previously specified. Stated in other words, rays of light emanating from a common point in any objective field of focus will always reach the points 94 and 95 or points spaced equal to the spacing of the points 94 and 95 regardless of any change in this objective field of focus. The prisms 41 and 42 thus act not only to bend the light rays outward so that two identical images are formed, but in addition these prisms act to maintain corresponding points of the adjacent images separated a constant distance from each other regardless of the objective field on which the lens system 33 is focused.

It will be understood that any conventional iris diaphragm may be used in conjunction with the lens elements 34 and 35 to control the amount of light passing therethrough and thus varying the amount of exposure necessary as well as the depth of focus obtainable in the objective field of focus.

My experiments indicate that the angle of the prisms 41 and 42 must be relatively small, usually not greater than 10° 30′ if apparent distortion is to be eliminated in a 16 mm. system. If the prisms are made with angles materially greater than 10° 30′ distortion will take place and in addition there will be a dispersion which may be apparent in the resulting images or in any screen image projected by the use of these images. If, however, small-angled prisms are used, entirely satisfactory results will be obtained. In this connection it will be apparent that in producing larger film images the prisms 41 and 42 must have correspondingly larger angles. I have found, however, that eminently satisfactory results are obtained if this system is used in the taking or projecting of 16 mm. film, or smaller. With such film the points 94 and 95 are separated substantially 0.3". With larger sizes of film it is difficult to eliminate apparent distortion and dispersion of the light rays, though in some instances this system can be used with the larger size film if exacting results are not necessary, especially if the lens system used has a relatively large focal distance.

So also, with lenses of shorter focal distance it will be clear that the prisms 41 and 42 must have correspondingly larger angles. For the most satisfactory results, the focal length should be 2" or more in a 16 mm. system, though this figure is not set forth as a definite limit below which commercially successful results cannot be obtained. Rather it is illustrative of the limits which I have found most desirable in producing resulting screen images which show no apparent distortion in a 16 mm. system. With less exacting requirements the system shown in Fig. 1 can be used in conjunction with a lens system having a focal distance of less than 2". So also, if film smaller than 16 mm. is used, this focal distance can be made less than 2" and still secure excellent results.

In Fig. 4 I have illustrated an alternative form of the invention which can be successfully used with 16 mm. film or with film of even larger size. Here, the front wall 10 is shown as including a sleeve 100 carrying bifurcations 101 between which is positioned a pinion 102. This pinion is mounted on a shaft extending through the bifurcation and a thumb wheel 103 is secured to this shaft so that by turning the thumb wheel the pinion 102 is rotated. This rotation is utilized in moving a barrel 105 in a forward-rearward direction, this barrel having teeth meshing with the pinion 102. Any suitable means not shown may be utilized for preventing any rotation of the barrel with respect to the front wall 10. This barrel contains a single-lens system 106 diagrammatically shown as comprising lens elements 107, 108, and 109.

The rear end of the barrel 105 carries a flared portion 110 in which is mounted a suitable prism means. In this form of the invention the prism means is of the reflecting type and includes outer reflecting surfaces 111 and 112 and inner reflecting surfaces 113 and 114. These surfaces may be suitably mirrored if desired or may be so disposed that total reflection takes place irrespective of any mirrored surface. The inner reflecting surfaces 113 and 114 may be formed by cutting a suitable groove 116 transversely through the prism means. It is preferable, however, to leave inward extending toes 117 and 118 at the front of this groove 116 so that the prism means may be formed substantially as shown in Fig. 4. In some instances it is possible to form the mirrored surfaces independently of any glass therebetween in which case suitable supports must be used for these surfaces. The light rays reflected therebetween will then move through air rather than through a transparent prism material such as glass.

A light ray emanating from a common point in the objective field of focus passing through the lens system 106 will, for instance, be reflected by the inner reflecting surface 113 so that it reaches the outer reflecting surface 111, being thence reflected to form a ray 120 which reaches the film at a point 121. Similarly, a ray coming from the same point in the objective field of focus will pass through the lens system 106 and be reflected by the inner reflecting surface 114, after which it can be reflected by the outer reflecting surface 112 to form a ray 122 reaching the film at a point 123. The points 121 and 123 are positioned a distance apart substantially equal to the center-to-center spacing of the adjacent image areas on the film. Similarly, rays emanating from any other point in the objective field of focus will be reflected to form point images on the film spaced from each other a distance substantially equal to the center-to-center spacing of the image areas or frames whereby two identical images of any object in the objective field of focus will be formed on adjacent image areas of the film.

In Fig. 4 I have illustrated the rays 120 and 122 as comprising the central rays, and it is very desirable that the prism structure be so designed that these rays are parallel to each other. Thus, as the prism means moves forward with the lens elements to change the objective field of focus, corresponding points of the adjacent image areas will be separated a constant distance. It is preferable in this form of the invention to use a septum means for separating the beams. This can be accomplished by providing a septum member 180 extending from a point between the toes 117 and 118 to a point adjacent the film, this septum member usually terminating at a dividing wall 181 of a double-aperture plate 182.

It will be clear that the forms of the invention shown in Figs. 1 and 4 can be used in projection systems as well as in conjunction with a camera. In a projection system it is necessary that light rays passing through corresponding points on the adjacent image areas being projected must reach the screen at a common point. Stated in other words, in projecting adjacent image areas, these image areas will respectively form constituent images on the screen, but these constituent images must be in exact registration in order to obtain a composite image. Thus, if these constituent images are formed by projecting through color filters corresponding in color to those used in exposing color-value images on the film, the resulting composite image will appear in natural colors in accordance with the principles involved in the well-known additive system of color projection. If, however, an attempt is made to bring the constituent images into superimposed relationship on screens at varying distances from the lens system, it will be found that this is impossible in the absence of some auxiliary compensating means. This compensation is automatically provided in the form of the invention shown in Fig. 1, due to the action of the prisms 41 and 42 and to the change in spacing between these prisms and the lens system as the lens system is moved to change the objective field of focus. Thus, when this system is used for projection purposes, light rays passing through the points 94 and 95 will always reach the screen at a single point regardless of the distance between this screen and the lens system. It should thus be clear that the invention is not limited in utility to a use in conjunction with a camera.

It will be clear that various changes may be made in the forms of the invention herein shown without departing from the spirit of the invention. It will also be clear that the invention finds utility regardless of whether or not color motion pictures are being produced. In the latter connection a double-exposure or double-projection black-and-white system permits a distinct saving in the amount of light necessary to expose the image areas, as well as in the amount of light which must be passed through each of these areas in projecting.

I claim as my invention:

1. Photographic apparatus for use with a film having adjacent image areas, comprising the combination of a double aperture film plate and guide, a single objective lens system, means to mount said lens system for movement in a forward-rearward direction to focus the same upon said amage areas, means to hold said system from angular movement to prevent lateral displacement of the images, prism means between said lens system and said film spaced a predetermined distance from said film, said prism means consisting of two elements each of isosceles trapezoidal cross section mounted apex to apex and splitting the beam of light moving through said lens system, and septum means extending from a mid-section of said prism means rearward to a position adjacent the space between said adjacent image areas of said film.

2. A combination as defined in claim 1 in which said septum means includes two septum members in alignment with each other but spaced end-to-end to define a space, in which a shutter of said photographic apparatus is mounted to operate.

3. A combination as defined in claim 1 in which said septum means includes two septum members in alignment with each other but spaced end-to-end to define a space, and in which said photographic apparatus includes a shutter and a color-filter support moving through said space, said color-filter support carrying a plurality of color filters successively intercepting the light rays passing through said prisms.

4. A combination as defined in claim 1 in which said prism means includes two prisms on opposite sides of said septum means, said septum means extending therebetween, and including means for retaining said prisms in fixed position whereby said lens system moves relative thereto when the focus of said lens system is changed.

5. In a lens structure for use in conjunction with a photographic apparatus including a film having adjacent image areas, the combination of: a single lens system transmitting light rays to said film, said film being in the image field of said lens system; means for moving said single-lens system in a forward-rearward direction relative to said film to change the objective field of focus and holding the same against angular movement to prevent lateral displacement of images; and prism means between said single-lens system and said film for splitting the entire beam of light passing through said single-lens system into two beams forming corresponding images on said adjacent image areas of said film and maintaining constant the separation of corresponding points of said images regardless of the change in objective field of focus, said prism means consisting of two prisms each having its refractive surfaces ground to an angle not materially greater that 10° 30'.

6. Photographic apparatus comprising, a double film aperture plate, a housing in fixed relation thereto, a barrel fitted and movable relative to said mounting member in a forward rearward direction but without angular movement, a single-lens system fixed in said barrel, the film guided by said aperture plate being in the image field of focus of said lens system, two prisms of isosceles trapezoidal cross section with the refractive surfaces thereof extending in planes forming an angle not materially greater than 10° 30', said prisms fixed in said housing between said lens system and said film aperture plate, each deflecting one half of the light rays passing from said lens to said film, and means for moving said barrel to change the objective field of focus, said prism acting to maintain constant separation of corresponding points in said image areas regardless of changes in the objective field of focus of said lens system.

7. Photographic apparatus comprising a double aperture film plate, a single-lens system mounted for focusing movement with respect to a film associated with said plate, and a prism system mounted a predetermined distance from said film and between it and said lens-system, said prism system composed of two prism elements of isosceles trapezoidal section mounted symmetrically apex to apex, to maintain a constant separation of the images transmitted to said film, the refractive surfaces of said elements having an angular relation of not materially greater than 10° 30'.

WILLIAM M. THOMAS.